(12) United States Patent
Nookala et al.

(10) Patent No.: US 11,816,179 B2
(45) Date of Patent: Nov. 14, 2023

(54) MOBILITY AND TRANSPORTATION NEED GENERATOR USING NEURAL NETWORKS

(71) Applicant: Volvo Car Corporation, Gothenburg (SE)

(72) Inventors: Usha Nookala, Sunnyvale, CA (US); Ebrahim Alareqi, Santa Clara, CA (US); Sihao Ding, Sunnyvale, CA (US); Shanmukesh Vankayala, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 17 days.

(21) Appl. No.: 16/829,005

(22) Filed: Mar. 25, 2020

(65) Prior Publication Data

US 2020/0226205 A1 Jul. 16, 2020

Related U.S. Application Data

(63) Continuation-in-part of application No. 16/120,561, filed on Sep. 4, 2018, now Pat. No. 11,429,987.

(Continued)

(51) Int. Cl.
*G06N 3/00* (2023.01)
*G06F 17/18* (2006.01)
(Continued)

(52) U.S. Cl.
CPC ............ *G06F 17/18* (2013.01); *G06N 3/045* (2023.01); *G06N 3/08* (2013.01); *G06Q 10/02* (2013.01);
(Continued)

(58) Field of Classification Search
None
See application file for complete search history.

(56) References Cited

U.S. PATENT DOCUMENTS 6,317,720 B1 11/2001 Murakami et al.
9,264,857 B1 * 2/2016 Rinckes ............... H04W 4/025
(Continued)

FOREIGN PATENT DOCUMENTS

CN 104766193 A 7/2015
EP 2506193 A1 10/2012
(Continued)

OTHER PUBLICATIONS

A. Rossi, G. Barlacchi, M. Bianchini and B. Lepri, "Modelling Taxi Drivers' Behaviour for the Next Destination Prediction," in IEEE Transactions on Intelligent Transportation Systems, vol. 21, No. 7, pp. 2980-2989, Date of Publication: Jun. 19, 2019 (Year: 2019).*

(Continued)

*Primary Examiner* — Matheus Ribeiro Stivaletti
(74) *Attorney, Agent, or Firm* — Clements Bernard Walker; Christopher L. Bernard

(57) ABSTRACT

A method, software tool, and system for generating realistic synthetic ride-requests associated with a mobility or transportation service, including: utilizing a generative adversarial network, learning the spatial-temporal distribution of a plurality of real ride-requests; and, utilizing the generative adversarial network and based on the learning step, generating one or more synthetic source and destination ride-request geolocations that retain a statistical distribution of the plurality of real ride-requests. The generative adversarial network is a Wasserstein generative adversarial network.

18 Claims, 3 Drawing Sheets

Related U.S. Application Data

(60) Provisional application No. 62/668,943, filed on May 9, 2018.

(51) Int. Cl.

| | | |
|---|---|---|
| *G06N 3/08* | (2023.01) | |
| *H04W 4/029* | (2018.01) | |
| *G06Q 50/30* | (2012.01) | |
| *H04W 4/021* | (2018.01) | |
| *G06Q 10/02* | (2012.01) | |
| *G06Q 10/047* | (2023.01) | |
| *G06N 3/045* | (2023.01) | |

(52) U.S. Cl.
CPC .......... *G06Q 10/047* (2013.01); *G06Q 50/30* (2013.01); *H04W 4/021* (2013.01); *H04W 4/029* (2018.02)

(56) References Cited

U.S. PATENT DOCUMENTS

| | | |
|---|---|---|
| 9,299,027 B2 | 3/2016 | Smith et al. |
| 9,754,490 B2 | 9/2017 | Kentley et al. |
| 9,776,512 B2 | 10/2017 | Netzer |
| 2002/0019760 A1 | 2/2002 | Murakami et al. |
| 2010/0185486 A1 | 7/2010 | Barker et al. |
| 2013/0144831 A1 | 6/2013 | Atlas |
| 2015/0186792 A1 | 7/2015 | Chidlovskii |
| 2016/0225262 A1 | 8/2016 | Edakunni et al. |
| 2017/0109764 A1 | 4/2017 | Tripathi et al. |
| 2017/0351955 A1 | 12/2017 | Fletcher |
| 2018/0096606 A1 | 4/2018 | Moreira-Matias et al. |
| 2019/0205785 A1 | 7/2019 | Volk et al. |

FOREIGN PATENT DOCUMENTS

| | | |
|---|---|---|
| JP | 2015122108 A | 7/2015 |
| WO | 2010123075 A1 | 10/2010 |
| WO | 2017148202 A1 | 9/2017 |

OTHER PUBLICATIONS

H. Yu, Z. Li, G. Zhang, P. Liu and J. Wang, "Extracting and Predicting Taxi Hotspots in Spatiotemporal Dimensions Using Conditional Generative Adversarial Neural Networks," in IEEE Transactions on Vehicular Technology, vol. 69, No. 4, pp. 3680-3692, Date of Publication: Mar. 4, 2020 (Year: 2020).*

Jun. 13, 2019 European Search Report issue on International Application No. EP19171255.

Zhao et al., Urban Human Mobility Data Mining: An Overview, 2016 IEEE International Conference on Big Data, pp. 1-10.

* cited by examiner

MOBILITY AND TRANSPORTATION NEED GENERATOR USING NEURAL NETWORKS

CROSS-REFERENCE TO RELATED APPLICATION

The present disclosure is a continuation-in-part (CIP) of co-pending U.S. patent application Ser. No. 16/120,561, filed on Sep. 4, 2018, and entitled "A DATA-DRIVEN METHOD AND SYSTEM TO FORECAST DEMAND FOR MOBILITY UNITS IN A PREDETERMINED AREA BASED ON USER GROUP PREFERENCES," which claims the benefit of priority of co-pending U.S. Provisional Patent Application No. 62/668,943, filed on May 9, 2018, and entitled "A DATA-DRIVEN METHOD AND SYSTEM TO FORECAST DEMAND FOR MOBILITY UNITS IN A PREDETERMINED AREA BASED ON USER GROUP PREFERENCES," the contents of both of which are incorporated in full by reference herein.

TECHNICAL FIELD

The present disclosure relates generally to the mobility and transportation fields. More particularly, the present disclosure relates to a mobility and transportation need generator using neural networks (NNs).

BACKGROUND

Ride-hailing services have become an important part of daily social life. Ride-hailing service providers collectively manage a fleet driven by more than 35 million drivers globally to fulfill ever-increasing demand. At such a scale, any optimization of the efficiency of ride-hailing algorithms will result in significant savings in cost and time, improved traffic flow, and reduced emissions.

The algorithms for smart fleet orchestration are often data hungry. The need for virtually unlimited, privacy-aware, and realistic synthetic data has been rising. For most researchers, large-scale real data is difficult to access. Even for ride-hailing service providers who own the data, it is still challenging to test rare or hypothetical scenarios. Synthesizing ride-requests realistically is problematic. In the time domain, the pattern of ride-requests is often different depending on time of day and day of the week. In the spatial domain, different regions, such as urban and suburban areas, usually present different patterns as well.

Thus, ride-hailing services have gained tremendous importance in social life today, and the amount of resources involved have steadily been increasing. Ride-request data is crucial to improving ride-hailing efficiency and minimizing cost. Accordingly, the present disclosure aims to model human mobility patterns to generate realistic ride-request data, thereby addressing the prevailing problem of a lack of historical training data and realistic synthetic data or different rare and hypothetical scenarios. Such synthetic generation inherently provides the desired anonymity. In particular, the present disclosure aims to model both temporal and spatial distributions jointly for ride-hailing services. A ride-request Wasserstein generative adversarial network (RR-WGAN) is proposed to generate plausible pick-up and drop-off geolocations. The generated ride-requests are extensively evaluated under a wide range of criteria, providing a comprehensive understanding of how the model performs. This is advantageous to ride-hailing service providers, research communities, policy-makers, and the like.

SUMMARY

The present disclosure proposes a generative model based on a generative adversarial network (GAN) to learn the spatial-temporal distribution of ride-requests. The RR-WGAN is presented as an alternative solution to previous graph-based work. Apart from historical ride riderequest data, the graph-based model requires prior knowledge of points-of-interest (POIs) in a geographical area. By using this pool of POIs, synthetic rides are generated. In such scenarios, geolocations of source and destination of synthetic ride-requests are limited to only a pool of available POIs. This is problematic if prior POI information in certain areas is sparse. The approach of the present disclosure requires minimal prior knowledge of POIs to generate synthetic geolocations. Currently, available historical opensource data is representative of only a portion of plausible ride-requests. With the RR-WGAN, the ride-request space can be explored in a more exhaustive manner by generating synthetic source (or pick-up) and destination (or drop-off) geolocations, while still retaining the statistics of true data distribution.

Thus, the present disclosure provides a novel spatialtemporal generative model, RR-WGAN, that is designed to perform ride-request generation. A mechanism is provided to incorporate the semantics of a neighborhood of the geolocation in a global embedding to encapsulate all riderequest information succinctly. A set of evaluation criteria is also provided for the ride-request generation task that provides benchmarks for future reference.

In one exemplary embodiment, the present disclosure provides a method for generating realistic synthetic riderequests associated with a mobility or transportation service, the method including: using a generative adversarial network, learning the spatial-temporal distribution of a plurality of real ride-requests; and, using the generative adversarial network and based on the learning step, generating one or more synthetic source and destination ride-request geolocations that retain a statistical distribution of the plurality of real ride-requests. The generative adversarial network is a Wasserstein generative adversarial network. The method further includes conditioning the generative adversarial network on temporal variables to jointly generate source and destination embeddings. The method further includes using a noise vector to jointly generate the source and destination embeddings. The method further includes, using a neural network of an encoder and a decoder associated with the generative adversarial network, mapping spatial information to a low-dimensional dense representation, with source and destination ride-request geolocations represented by respective embeddings instead of latitude and longitude prior to decoding and latitude and longitude after decoding. Semantics of location surroundings are captured in the source and destination ride-request geolocations by processing a pointof-interest vector. The method further includes normalizing the one or more synthetic source and destination ride-request geolocations to location coordinates. The method further includes assigning points-of-interest to the location coordinates during the learning step. The generative adversarial network includes a generator that produces synthetic samples from a noise source to mimic real world data and a discriminator that differentiates synthetic ride request data from real world ride request data.

In another exemplary embodiment, the present disclosure provides a non-transitory computer-readable medium for generating realistic synthetic ride-requests associated with a mobility or transportation service stored in a memory and executed by a processor to perform the steps including: using a generative adversarial network, learning the spatial-temporal distribution of a plurality of real ride-requests; and, using the generative adversarial network and based on the learning step, generating one or more synthetic source and destination ride-request geolocations that retain a statistical distribution of the plurality of real ride-requests. The generative adversarial network is a Wasserstein generative adversarial network. The steps further include conditioning the generative adversarial network on temporal variables to jointly generate source and destination embeddings. The steps further include using a noise vector to jointly generate the source and destination embeddings. The steps further include, using a neural network of an encoder and a decoder associated with the generative adversarial network, mapping spatial information to a low-dimensional dense representation, with source and destination ride-request geolocations represented by respective embeddings instead of latitude and longitude prior to decoding and latitude and longitude after decoding. Semantics of location surroundings are captured in the source and destination ride-request geolocations by processing a point-of-interest vector. The steps further include normalizing the one or more synthetic source and destination ride-request geolocations to location coordinates. The steps further include assigning points-of-interest to the location coordinates during the learning step. The generative adversarial network includes a generator that produces synthetic samples from a noise source to mimic real world data and a discriminator that differentiates synthetic ride request data from real world ride request data.

In a further exemplary embodiment, the present disclosure provides a system for generating realistic synthetic ride-requests associated with a mobility or transportation service, the system including: a generative adversarial network operable for: learning the spatial-temporal distribution of a plurality of real ride-requests; and generating one or more synthetic source and destination ride-request geolocations that retain a statistical distribution of the plurality of real ride-requests. The generative adversarial network is a Wasserstein generative adversarial network.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

The present disclosure models the spatial-temporal distribution of ride-requests to synthesize them realistically from a generative model. An $i^{th}$ ride-request $R_i \in \Phi$ is comprised of source location $s_i$ and destination location $d_i$ represented by latitude and longitude. The time at which the ride $R_i$ was requested by the customer is given by $t_i$. Therefore, $\Phi$ contains ride-requests represented as $R_i$: $(t_i, s_i, d_i)$. It is assumed that each ride-request is independent of another. The problem of modeling a ride-request is formulated as learning a joint distribution of source and destination locations given time t. S and D are continuous random variables of source location and destination location, respectively. The joint probability density for a given time t is represented by:

$$p_t = Q_{S,D}(s,d|t) \quad (1)$$

Figure 1:
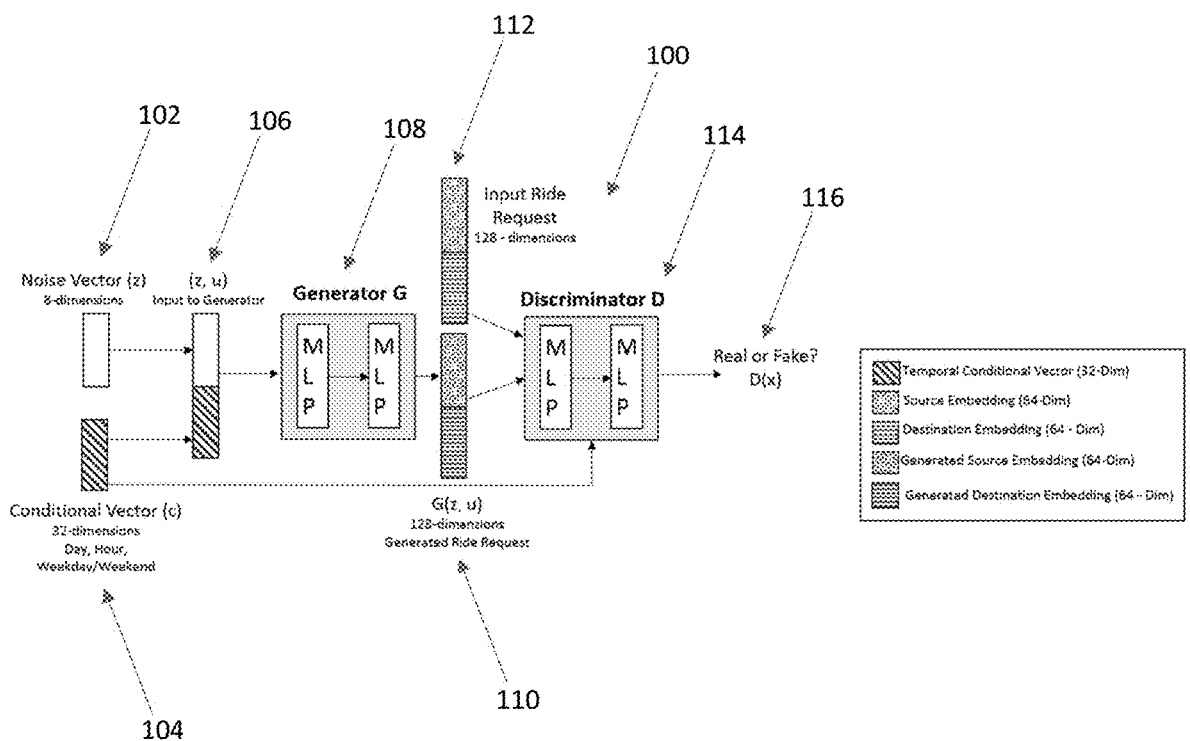
FIG. 1 is a schematic diagram illustrating one exemplary embodiment of the WGAN architecture of the present disclosure.

FIG. 1 is a schematic diagram illustrating one exemplary embodiment of the RR-WGAN architecture 100 of the present disclosure. The WGAN architecture 100 includes a noise vector (z) 102 and a conditional vector (c) 104 that are combined as an input (z,u) 106 to a generator G 108 that performs multi-layer perceptron (MLP) steps to provide an array of generated ride-requests G(z,u) 110. An array of input ride-requests 112 and the generated ride-requests G(z, u) 110 are fed to a discriminator D 114 that also performs MLP steps, also using the conditional vector (c) 104, to determine a real or fake output D(x) 116.

Thus, a generative approach is used to learn $Q(\cdot)$ at different t, in order to generate ride-requests including new source and destination locations.

Figure 2:
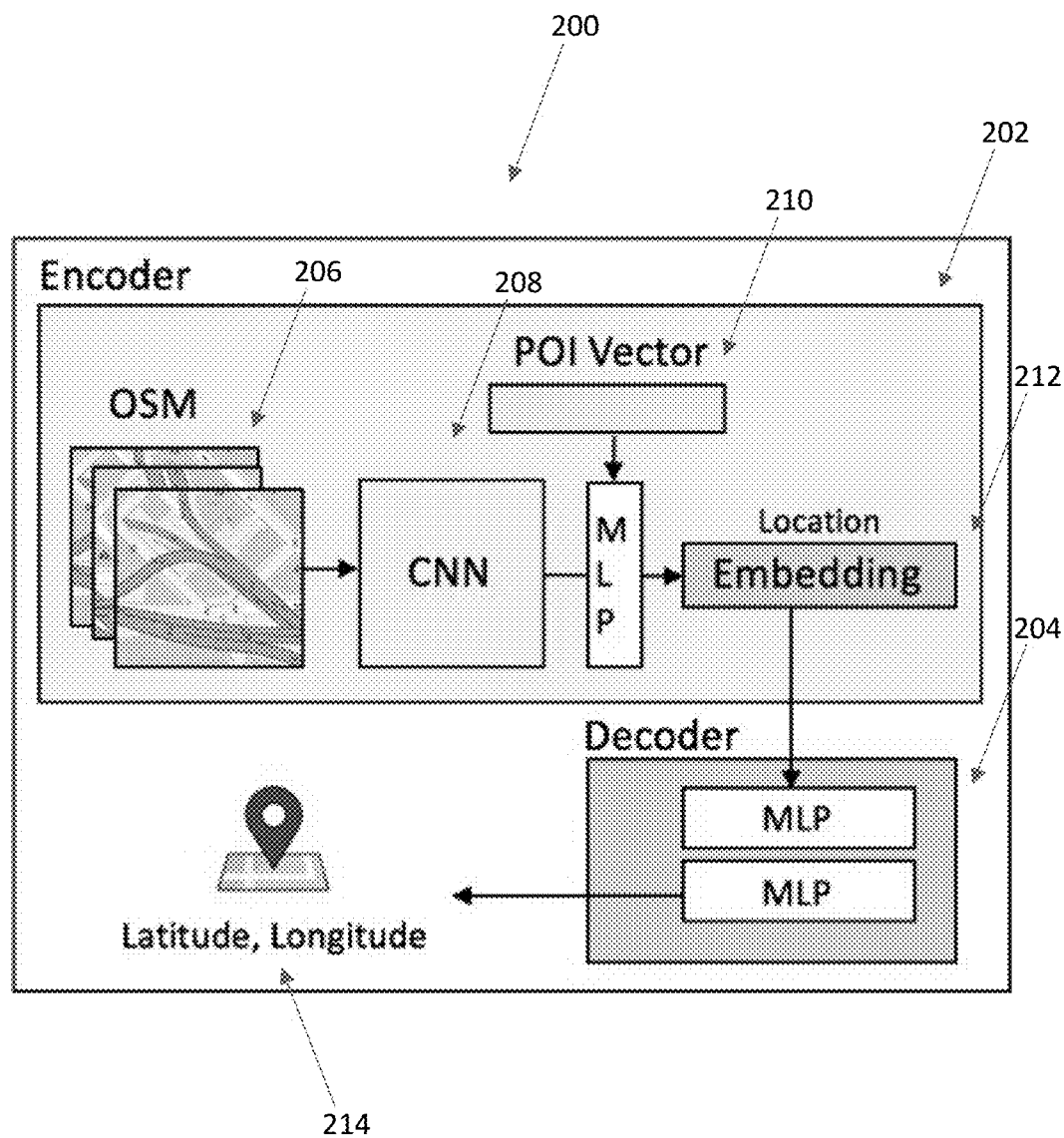
FIG. 2 is a schematic diagram illustrating one exemplary embodiment of the encoder-decoder network for location embedding of the present disclosure.

FIG. 2 is a schematic diagram illustrating one exemplary embodiment of the encoder-decoder network 200 for location embedding of the present disclosure, forming a key part of the RR-WGAN architecture 100 (FIG. 1). The encoder-decoder network 200 includes and encoder 202 and a decoder 204, as well as the Wasserstein generative adversarial network (WGAN). The encoder 202 and decoder 204 map spatial information to a low-dimensional dense representation. Further, the source and destination locations can be represented with their respective embeddings, instead of latitude and longitude. The WGAN is conditioned on temporal variables to jointly generate source and destination embeddings. The encoder 202 feeds OSMs 206 to a convolutional neural network (CNN) 208 that performs MLP module processing with a POI vector 210 to provide location embedding 212 that is then fed to the decoder 204 for further MLP module processing to generate the desired latitude and longitude data 214. In this sense, the encoder-decoder network 200 utilizes OSMs 206 for each global positioning system (GPS) coordinate, as well as POI vectors 210 about the surroundings (in categories) to train the model, and the decoder 204 provides corresponding latitude and longitude data 214. The RR-WGAN architecture of FIG. 1 then generates corresponding synthetic data with smaller realistic input, all via the use of the CNN 208 (FIG. 2). Thus, a model can be generated with synthetic (i.e., fake), but realistic, data based on inputs like day, time, and number of ride-requests, with pick-up and drop-off simulations then being enabled.

In order to generate a ride-request, the GPS coordinates must be converted to a meaningful representation. This problem is formulated as a joint embedding learning of two data modalities: Map Data and POIs.

Figure 3:
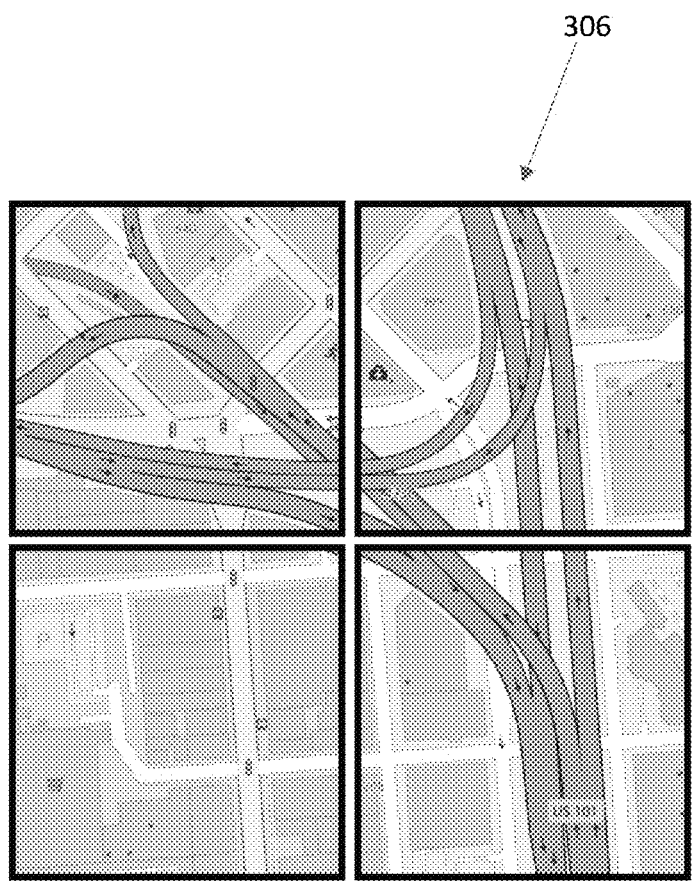
FIG. 3 provides examples of raw images from open street maps (OSMs) for neighboring tiles.

Map Data captures spatial properties of a given location based on visual features of raw input images obtained from OSM data 306, as shown in FIG. 3. A location has a more similar embedding to a spatially close location than to a spatially distant location. The tile images I obtained from OSM are leveraged to learn visual cues of a location, such as the roadways, water bodies, etc. In $I=\{I_1, I_2, I_3, \ldots, I_n\}$, each tile image $I_i$ is bounded by spatial boundaries given by $(lat^i_{min}, lat^i_{max}, lon^i_{min}, lon^i_{max})$.

POI data profiles a given location based on venue categories in the proximity of the region. For instance, if a geolocation is in downtown area of the city, then one finds venues like restaurants, coffee shops, and entertainment avenues in nearby locations. On the other hand, if a geolocation is in a suburban area, it is usually surrounded by residential houses, gyms, and other recreational centers. Ten categories are defined to obtain the distribution of POIs for a given location. P represents a set of vectors including the distribution of all categories, $P=P_1, P_2, P_3, \ldots, P_n$, where each POI vector represents $P_i=(lat^i, lon^i, M)$. Here, M is a k-dimensional vector, where k is the number of POI categories.

This representation would not only encode the spatial information of a given geolocation, but also capture the semantics of the location surroundings. The RR-WGAN is trained to eventually learn to generate similar embeddings, so that no such POI prior information is needed during inference. A given location is represented with a corresponding tile with spatial resolution of 100×100 meters, along with a 10-dimensional POI vector. To obtain an embedding, the encoder-decoder network 200 (FIG. 2) is jointly trained in order to map a high-dimensional tile image and POI vector to latent Euclidean space. $F: v \rightarrow H \in R^{(n \times d)}$, where $F(\cdot)$ is a non-linear mapping function that maps input $v=\{I, P\}$ to latent space H of d dimension. Therefore, the input to the encoder-decoder framework is a tuple containing $\{v, target_{lat,lon}\}$, where $target_{lat,lon}$ is the normalized latitude and longitude of a target location.

The encoder 202 (FIG. 2) includes the CNN 208 (FIG. 2) to map the spatial tile images 206 (FIG. 2) to a low-dimension dense encoding, which later is combined with the 10-dimensional POI vector 210 (FIG. 2) before passing it to fully connected layers. The output of the encoder 202 is therefore a 64-dimensional representation vector.

Triplet loss is defined to bring embeddings of two similar locations close to each other in the Euclidean space, while pushing those of distinct locations further apart. Triplets are defined, where each triplet includes an anchor location $v_a$, a neighbor location $v_n$ that is spatially close, and a distant location $v_d$ that is farther from the location of interest. Therefore, to minimize the distance between $v_a$ and $v_n$, while maximizing the distance between $v_a$ and $v_d$, the triplet loss TL is defined as:

$$TL(v_a, v_n, v_d) = [\|f(v_a) - f(v_n)\|_2 - \|f(v_a) - f(v_d)\|_2 + m]_+ \quad (2)$$

where $[\cdot]_+$ is a rectifier unit, $\max(0, \cdot)$. The function $f(\cdot)$ is approximated through the encoder network 200 in FIG. 2, and m is the margin that puts a restriction on how far the distant embedding can be pushed, i.e., if $\|f(v_a) - f(v_d)\|_2 + m < \|f(v_a) - f(v_n)\|_2$, the TL is minimized to bring the $f(v_a)$ and $f(v_n)$ close to each other.

The decoder 204 (FIG. 2) maps the above embedding of every geolocation to normalized 2-dimensional Cartesian coordinates. WGS84 Web Mercator is post-processed to WGS84. If $target_{lat,lon}$ and the output of decoder are y and y', respectively, the decoder loss is defined as a mean-squared error loss, MSE(y, y').

The encoder 202 and decoder 204 are jointly trained with a triplet loss and mean squared error loss:

$$Loss(v, target_{lat,lon}) = \lambda_1 \cdot TL(v_a, v_n, v_d) + \lambda_2 \cdot MSE(y, y'), \quad (3)$$

where $\lambda_1$ and $\lambda_2$ are model trade-off parameters.

The GAN 100 (FIG. 1) contains two key components: generator G 108 (FIG. 1) and discriminator D 114 (FIG. 1). The generator 108 produces synthetic samples from a noise source to mimic real world data, while the discriminator differentiates synthetic ride request data from real world ride request data. Specifically regarding the use of the WGAN 100, it has been proposed to minimize Jensen-Shannon (JS)-divergence between real and synthetic distributions. However, JS-divergence is not continuous and differentiable everywhere, leading to difficulties during training. In addition, JS-divergence suffers from a vanishing gradient problem, and mode collapse leading to poor diversity in generated samples. It has also been proposed to minimize Wasserstein or Earth Mover's distance as a better alternative to achieve stable GAN training.

Let $P_r$ be the real data distribution, and $P_g$ be the distribution of the generated data. $P_g$ is approximated with a neural network such that $P_g = g\theta(z)$, where $\theta$ is the learnable parameter, and noise z is sampled $z \sim P_z(z)$. The Wasserstein distance is the minimum cost of transporting mass involved in transforming $P_r$ to $P_g$. The Wasserstein distance W ($P_r, P_g$) is given as:

$$W(P_r, P_g) = \inf_{\gamma \in \Pi(P_r, P_g)} \mathbb{E}_{(x,y) \sim \gamma} \|x - y\|, \quad (4)$$

However, the above equation for the Wasserstein distance is highly intractable. Using the Kantorovich-Rubinstein duality, the Wasserstein distance is simplified as:

$$W(P_r, P_g) = \sup_{\|f\|_L \leq 1} \mathbb{E}_{x \sim P_r}[f(x)] - \mathbb{E}_{x \sim P_g}[f(x)], \quad (5)$$

where the supremum is taken over all the 1-Lipschitz function. In order calculate the Wasserstein distance, the 1-Lipschitz function can be approximated with a neural network such that $f: X \rightarrow R$. Lastly, gradient update for the WGAN 100 is given as:

$$\nabla_\theta W(P_r, P_g) = \nabla_\theta (\mathbb{E}_{x \sim P_r}[f_w(x)] - \mathbb{E}_{z \sim P_Z}[f_w(g_\theta(z))]). \quad (6)$$

Here, $f_w$, which maps input to output of the discriminator 114 is the optimal approximation of the Wasserstein distance. In order to-enforce the Lipschitz constraint, the weights in $f_w$ are clipped to a range [-c, c], where c is a constant. The WGAN framework is used to generate ride-requests.

The RR-WGAN network 100 (FIG. 1) models the space of ride-requests formulated above. Furthermore, temporal information is crucial for modeling ride-requests as spatial patterns are largely dependent on time. For instance, pick-up and drop-off demand peaks during rush hour on weekends in downtown areas. These spatial-temporal dependencies motivate one to condition the RR-WGAN network 100 with categorical temporal information denoted by $u \in U$. u includes the one-hot encoded vector representation given by $u_i = \{day_i, hour_i, isWeekend_i\}$ that captures the spatial distribution of source and destination for a given $u_i$. Here, hour is the 24-dimensional hour of the day, day is the 7-dimensional day of the week categorical variable representing Monday to Sunday, and isWeekend is the 1-dimensional Boolean that denotes weekend or weekday.

The ride-request embedding $H_r = \{H_s, H_d\}$ includes concatenated embeddings of generated sources $H_s$ and destinations $H_d$. Here, $H_s$ and $H_d$ are 64-dimensional vectors ranging from −1 to 1. The $H_r$ ride-request vector thus generated is 128-dimensional. The generator maps input $Z^t$ to an embedding of ride-request $H_r^t$ to generate fake samples, i.e., $G: Z^t \rightarrow H_r^t \in R^{(nx(ds+dd))}$, where G is the generator function and $Z^t = \{Z, U\}$ is concatenated with noise vector Z, and conditional vector U described above. The generator G 108 takes in $Z^t$ as an input to generate a 128-dimensional synthetic ride-request, where the first 64-dimensions represent source and the last 64-dimensions represent destination embeddings, respectively. The discriminator D 114 distinguishes the 128-dimensional synthetic ride-requests $H_r^t$ from the 128-dimensional real requests $H_r$.

The overall flow of RR-WGAN framework is as follows: (1) one obtains location embeddings for both source and destination from the method proposed above; and (2) after training the RR-WGAN 100, one conditions it a temporal vector along with a noise vector to generate a ride-request. For a given conditional vector, one can generate any number of ride-requests by sampling an equal amount of random noise vectors, which ensures flexibility in the number of ride-requests generated; and (3) lastly, the generated ride-requests including source and destination embeddings can be decoded to normalized to GPS coordinates through the pre-trained decoder 204. Note that each location embedding, source and destination, is decoded separately. If the generated location does not have a valid POI, it is assigned the nearest POI to that location.

Evaluation of the GAN 100 is a difficult task. Several metrics have been proposed in the literature related to the image and speech domains. Here, it is necessary to evaluate if the synthetic source and destination locations are statistically consistent with the ground-truth distribution. Further, these ride request orders have dynamic spatial-temporal properties. Therefore, any evaluation metrics are defined to measure the spatial and temporal similarities. Through the literature, it has been discovered that ride-request graphs that evolve with time exhibit a Densification Power Law (DPL) property. A city can be divided into grids. A ride-request graph (RRG) includes nodes and edges; at each time t a new RRG is formed. Each grid is identified as a node, and an edge is formed from source node to destination node for every ride-request. Therefore, the number of ride-requests is equal to the number of edges, at given time t. It is empirically observed that for every time t:

$$e(t) \propto n(t)^\alpha = Cn(t)^\alpha,$$

where e(t) is the number of edges and n(t) is the number of nodes at time t. The densification refers to the growing number of nodes relative to the number of edges with temporal evolution. Although the above C and α are representative of a geographical area to a certain extent in both spatial and temporal domains, they do not provide insights into inherent characteristics of mobility patterns. Also, these parameters do not quantify the similarity of generated ride-requests' connectivity distribution to that of the ground-truth.

In order to provide a comprehensive evaluation of synthetic ride-requests, the following criteria need to be taken into consideration with respect to the true data distribution. They are grouped into spatial metrics and temporal metrics, as discussed.

The spatial characteristics of the synthetic ride-requests are evaluated both independently and aggregated at a grid level. With respect to the RV Coefficient, let O =(N, E) be a directed graph of a ride-request with node set N= $(n_1, n_2, \ldots n_N)$. Each node spans across a geographical area of 500×500 meters for evaluation purposes. In the graph O, each edge between source node $n_i$ and destination node $n_j$ is weighted by the number of ride-requests originating from a source towards a destination node, denoted with $w_{ij}$. The weighted adjacency matrix is represented by W= $(w_{ij})_{ij=1,2,3 \ldots n}$. If normalized real and generated weighted adjacency matrices are denoted with $W_r$ and $W_g$, respectively, the RV coefficient between two adjacency matrices is given by:

$$RV = \frac{tr(W_r W_g)}{\sqrt{tr(W_r W_g) \cdot tr(W_r W_g)}}. \tag{8}$$

Essentially, the RV coefficient gives the correlation between real and generated adjacency matrices $W_r$ and $W_g$, respectively. It ranges from [0, 1] or can be expressed as a percentage.

Regarding the Bhattacharyya distance for trip distance, a metric is defined to evaluate the trip distance from source to destination for every synthetic ride-request. Trip distance is the distance in kilometers from source to destination. If $D_r$ is the real trip distance distribution and $D_g$ is the generated trip distance distribution, the Bhattacharyya distance metric is given by:

$$B_d = lnBC(D_r, D_g), \tag{9}$$

$$BC(D_r, D_g) = \int \sqrt{D_r(x) D_g(x)} dx. \tag{10}$$

$B_d$ is the distance between the two trip distance distributions and BC is the Bhattacharyya coefficient ranging from (0, 1).

The geographical areas are characterized into different segments. In general, downtown characterizes main business or commercial areas of a city, non-downtown regions are areas slightly farther from downtown but within city limits. Finally, suburbs characterize both residential and non-commercial areas of a city. Percentages of trips to and from various segments were obtained as a proportion of total ride-requests.

Temporal similarity metrics measure the aggregated pick-up demand (or source demand) of ride-requests across different geographic segments. Root-Mean-Square-Error (RMSE) and Symmetric Mean Average Percentage Error (SMAPE) are considered for the above geographic segments. If $a_r$ is the real pick-up demand and $a_g$ is the generated demand for n time period, SMAPE is given by:

$$SMAPE = \frac{100}{n} \times \sum_\mu \frac{|a_r - a_g|}{|a_r| + |a_g|} \bigg/ 2 \tag{11}$$

Thus, the present disclosure proposes a novel generative approach to tackling the challenges of limited access to ride-request data. With the RR-GAN methodology, synthetic source and destination locations are synthesized to a fine granularity, as well as generated ride-requests with adequate diversity. More modalities, like weather, events, and other relevant information can be added to the model. Furthermore, one can study the effects of generated data in simulations, such as vehicle reallocation and dynamic ride-pooling simulations.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus, the overall flow of the RR-WGAN framework of the present disclosure is as follows: (1) location embeddings are obtained for both source and destination; (2) after training the RR-WGAN, a temporal vector is conditioned along with a noise vector to generate a ride-request. For a given conditional vector, any number of ride-requests can be generated by sampling an equal amount of random noise vectors, which ensures flexibility in the number of ride-requests generated; (3) lastly, the generated ride-requests including source and destination embeddings can be decoded to normalized to GPS coordinates through the pre-trained decoder. Note that, each location embedding, source, and destination, is decoded separately. If the generated location does not have a valid POI, it is assigned the nearest POI to that location.

As new mobility offers are crowding the market, the understanding of their effects on society and the development of potential remedies is fragmented due to siloed data ownership and privacy concerns. The output of the software of the present disclosure is useful for:

1. Anonymization—The output is synthetic, thus anonymous by nature, but sufficiently realistic for understanding mobility patterns. This is beneficial in today's landscape with increased debate and legislation related to privacy.

2. Data volume—For any entity with scarce access to mobility data, this tool provides a way to overcome that scarcity and develop a better understanding of mobility patterns by only inputting low-volume initial data. This is beneficial for commercial newcomers who enter the marketplace, as well as for public officials.

3. What-if planning and analysis—What is unique to the solution of the present disclosure is the characterization of demand reached by encoding Point-of-Interest (POI) data with pick-up and drop-off data. The software could essentially provide answers to "if we build a shopping district here, how would demand for mobility—and in turn congestion—change?". This is beneficial for various decision-making entities, ranging from public officials (policy-makers) to commercial players (for providing improved service).

4. Data driven development to tackle congestion and emissions—The output could very well be focused to tackle major issues associated with urbanization; what (infrastructure investments) do we need to do to efficiently move people around? With the rise of data-driven methods for finding solutions, realistic data is crucial for high quality analysis.

Extrapolating from this work, the tool can potentially be used for generating synthetic but realistic mobility patterns for cities where no data is available. This expands the software usability and purpose for both traffic planning (e.g. "what type of shuttle service should we employ?"; "where do we invest in bus stops?") and commercial business case analysis (e.g. "which city would it make sense for us to enter?"; "where should we strategically place our e-scooters?"). Other applications are, of course, contemplated herein.

Although the present disclosure is illustrated and described herein with reference to preferred embodiments and specific examples thereof, it will be readily apparent to one of ordinary skill in the art that other embodiments and examples can perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A computer-implemented method, comprising:
forming map images, using at least one processor, by obtaining open street map images and capturing spatial properties of given locations based on visual features of raw input images;
utilizing an encoder-decoder network and the at least one processor, mapping spatial information from the map images to a low-dimensional dense representation, with source and destination ride-request geolocations represented by respective embeddings instead of latitude and longitude prior to decoding and latitude and longitude after decoding, wherein an encoder of the encoder-decoder network feeds map data for neighboring tiles to a convolutional neural network that performs multi-layer perceptron processing with a point-of-interest vector to provide location embeddings and the decoder translates the location embeddings to provide associated latitudes and longitudes;
training a generative adversarial network using the at least one processor, the location embeddings provided by the map data for the neighboring tiles and the point-of-interest vector, and the associated latitudes and longitudes from the encoder-decoder network to learn the spatial-temporal distribution of a plurality of real ride-requests;
utilizing the at least one processor, the generative adversarial network, and based on the learned spatial-temporal distribution of the plurality of real ride-requests, generating synthetic source and destination ride-request geolocations for an area for which it is determined that adequate point-of-interest and historical source and destination ride-request geolocations are not available, wherein the synthetic source and destination ride-request geolocations are anonymized and retain a statistical distribution of the plurality of real ride-requests;
wherein the synthetic source and destination ride-request geolocations are generated utilizing the at least one processor and by inputting a conditional temporal vector and a noise vector to a generator of the generative adversarial network, wherein the generator performs multi-layer perceptron steps to generate the synthetic source and destination ride-request geolocations;
determining a real or fake output feedback utilizing the at least one processor and a discriminator of the generative adversarial network that also performs multi-layer perceptron steps using the synthetic source and destination ride-request geolocations, an array of input ride requests, and the conditional temporal vector; and
utilizing the synthetic source and destination ride-request geolocations as data in a transportation model when it is determined that the adequate point-of-interest and historical source and destination ride-request geolocations are not available.

2. The computer-implemented method of claim 1, further comprising conditioning the generative adversarial network on temporal variables using the conditional temporal vector to jointly generate source and destination embeddings.

3. The computer-implemented method of claim 2, further comprising utilizing the noise vector to jointly generate the source and destination embeddings.

4. The computer-implemented method of claim 1, wherein semantics of location surroundings are captured in the source and destination ride-request geolocations by processing the point-of-interest vector.

5. The computer-implemented method of claim 4, wherein the point-of-interest vector comprises a distribution of location categories resulting in a quantifiable location representation.

6. The computer-implemented method of claim 1, further comprising normalizing the synthetic source and destination ride-request geolocations to location coordinates.

7. The computer-implemented method of claim 6, further comprising assigning points-of-interest to the location coordinates during the learning step.

8. The computer-implemented method of claim 1, wherein the generative adversarial network comprises the generator that produces synthetic samples from a noise source to mimic real world data and the discriminator that differentiates synthetic ride request data from real world ride request data.

9. The computer-implemented method of claim 1, wherein the transportation model comprises one of a ride-hailing service model and an infrastructure development model.

10. A non-transitory computer-readable medium stored in a memory and executed by a processor to perform the steps comprising:
forming map images by obtaining open street map images and capturing spatial properties of given locations based on visual features of raw input images;
utilizing an encoder-decoder network, mapping spatial information from the map images to a low-dimensional dense representation, with source and destination ride-request geolocations represented by respective embeddings instead of latitude and longitude prior to decoding and latitude and longitude after decoding, wherein an encoder of the encoder-decoder network feeds map data for neighboring tiles to a convolutional neural network that performs multi-layer perceptron processing with a point-of-interest vector to provide location embeddings and the decoder translates the location embeddings to provide associated latitudes and longitudes;
training a generative adversarial network using the location embeddings provided by the map data for the neighboring tiles and the point-of-interest vector and the associated latitudes and longitudes from the encoder-decoder network to learn the spatial-temporal distribution of a plurality of real ride-requests;
utilizing the generative adversarial network and based on the learned spatial-temporal distribution of the plurality of real ride-requests, generating synthetic source and destination ride-request geolocations for an area for which it is determined that adequate point-of-interest and historical source and destination ride-request geolocations are not available, wherein the synthetic source and destination ride-request geolocations are anonymized and retain a statistical distribution of the plurality of real ride-requests;
wherein the synthetic source and destination ride-request geolocations are generated by inputting a conditional temporal vector and a noise vector to a generator of the generative adversarial network, wherein the generator performs multi-layer perceptron steps to generate the synthetic source and destination ride-request geolocations;
determining a real or fake output feedback utilizing a discriminator of the generative adversarial network that also performs multi-layer perceptron steps using the synthetic source and destination ride-request geolocations, an array of input ride requests, and the conditional temporal vector; and utilizing the synthetic source and destination ride-request geolocations as data in a transportation model when it is determined that the adequate point-of-interest and historical source and destination ride-request geolocations are not available.

11. The non-transitory computer-readable medium of claim 10, the steps further comprising conditioning the generative adversarial network on temporal variables using the conditional temporal vector to jointly generate source and destination embeddings.

12. The non-transitory computer-readable medium of claim 11, the steps further comprising utilizing the noise vector to jointly generate the source and destination embeddings.

13. The non-transitory computer-readable medium of claim 10, wherein semantics of location surroundings are captured in the source and destination ride-request geolocations by processing the point-of-interest vector.

14. The non-transitory computer-readable medium of claim 13, wherein the point-of-interest vector comprises a distribution of location categories resulting in a quantifiable location representation.

15. The non-transitory computer-readable medium of claim 10, the steps further comprising normalizing the synthetic source and destination ride-request geolocations to location coordinates and assigning points-of-interest to the location coordinates during the learning step.

16. The non-transitory computer-readable medium of claim 10, wherein the generative adversarial network comprises the generator that produces synthetic samples from a noise source to mimic real world data and the discriminator that differentiates synthetic ride request data from real world ride request data.

17. The non-transitory computer-readable medium of claim 10, wherein the transportation model comprises one of a ride-hailing service model and an infrastructure development model.

18. A system, comprising:
memory storing instructions executed by a processor for providing an encoder-decoder network operable for:
forming map images by obtaining open street map images and capturing spatial properties of given locations based on visual features of raw input images;
mapping spatial information from the map images to a low-dimensional dense representation, with source and destination ride-request geolocations represented by respective embeddings instead of latitude and longitude prior to decoding and latitude and longitude after decoding, wherein an encoder of the encoder-decoder network feeds map data for neighboring tiles to a convolutional neural network that performs multi-layer perceptron processing with a point-of-interest vector to provide location embeddings and the decoder translates the location embeddings to provide associated latitudes and longitudes; and memory storing instructions executed by a processor for providing a generative adversarial network operable for:
being trained using the location embeddings provided by the map data for the neighboring tiles and the point-of-interest vector and the associated latitudes and longitudes from the encoder-decoder network to learn the spatial-temporal distribution of a plurality of real ride-requests;
generating synthetic source and destination ride-request geolocations that retain a statistical distribution of the plurality of real ride-requests for an area for which it is determined that adequate point-of-interest and historical source and destination ride-request geolocations are not available, wherein the synthetic source and destination ride-request geolocations are anonymized and retain a statistical distribution of the plurality of real ride-requests;
wherein the synthetic source and destination ride-request geolocations are generated by inputting a conditional temporal vector and a noise vector to a generator of the generative adversarial network, wherein the generator performs multi-layer perceptron steps to generate the synthetic source and destination ride-request geolocations;
determining a real or fake output feedback utilizing a discriminator of the generative adversarial network that also performs multi-layer perceptron steps using the synthetic source and destination ride-request geolocations, an array of input ride requests, and the conditional temporal vector; and
utilizing the synthetic source and destination ride-request geolocations as data in a transportation model when it is determined that the adequate point-of-interest and historical source and destination ride-request geolocations are not available.

* * * * *